3,040,359
WINDSHIELD WIPER
Raymond A. Deibel, Cheektowaga, N.Y., assignor to Trico Products Corporation, Buffalo, N.Y.
Filed Aug. 31, 1956, Ser. No. 607,455
3 Claims. (Cl. 15—250.36)

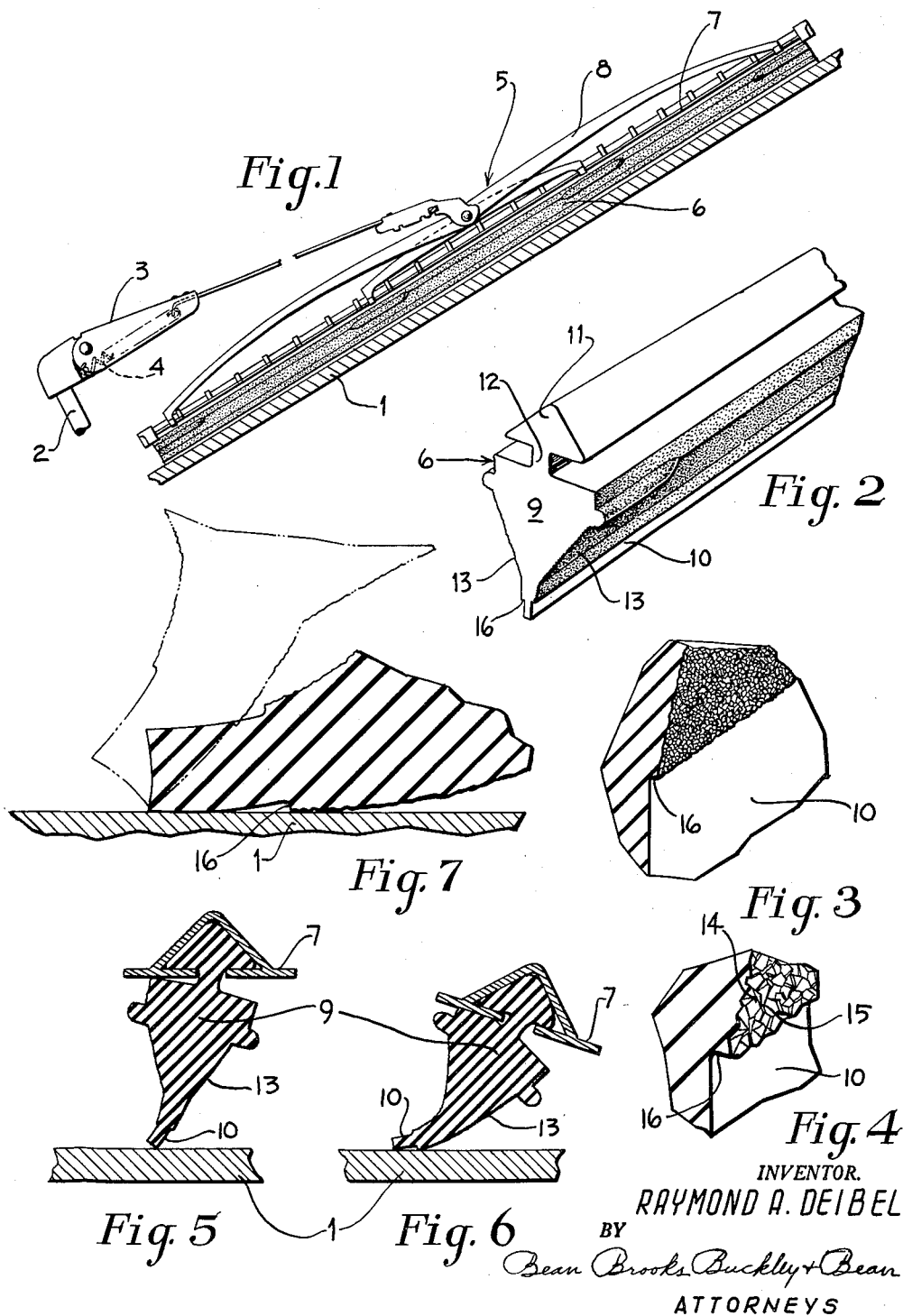

This invention relates to a windshield cleaner and more particularly to the wiping blade element thereof which is usually made of rubber, or other suitable material which is comprehended within that term as used herein. Since the introduction of the curved windshield, the rubber blade element has been supported by a surface conforming backing to receive spring pressure from an oscillatory actuating arm through a pressure distributing and applying superstructure. In executing the wiping pattern, the wiping blade drags at an incline across the glass. When the glass surface is wet, the wiping lip will move across the deeply curved contours of the windshield glass with a minimum of friction, but if the surface is only partially wet and interspersed with dry areas, the rubber wiping lip will adhere to the latter and tug upon the actuating arm thereby imposing an abnormal torque load on the cleaner mechanism even to the extent of stalling it. Upon encountering a wet area the wiping lip will let go with a forward jump of the wiper. When the cling again manifests itself, this action repeats and an irregular movement results. Thus, the wiping action becomes inefficient.

Attempts have been made to find a satisfactory solution to this cling problem. Skid knobs have been provided at intervals on the sides of the blade to limit the lip adhesion but at times these knobs will fulcrum the wiping lip off the glass and leave arcuate lines delineating their paths. A differential in the coefficient of friction between the blade and lip materials has been suggested, the two grades of rubber being vulcanized together. Again, sponge rubber has been suggested for wiping blades but their cells individually cling and disintegrate by reason of the unstable wall structure.

Furthermore, when the rubber adheres to the glass, rubber fibers are deposited on its surface, with the result that under certain driving conditions the effort to use the blade on a partially wet surface damages the blade and impairs the field of vision until the rubber deposits have been scrubbed off, as by a subsequent normal wiping under fully wet conditions. Variations in the rubber texture, including surface hardening of the rubber, have been found inadequate to cope with this problem. Hardening the surface of the rubber reduces the quality of the wipe when the glass is fully wet.

An object of this invention is to provide a windshield wiper which will automatically act to control the clinging tendency of the wiping lip without breaking its wiping contact. Provision is herein made to limit the excessive forward rolling of the blade through a balanced relation between the cling factors of the wiping lip and the adjacent sides of the blade body. The blade embodies a shallow wiping lip that is solely effective on a wet glass and a normally inoperative secondary face of relatively greater area that is mechanically treated or broken to restrict its adhesion to a lesser degree when brought into contact with a partly wet glass, thereby to thwart the forward roll tendency of the blade and thus maintaining the wiping contact without overloading the driving mechanism.

Accomplishment of this desired purpose is herein achieved by unitary structural characteristics of a wiping blade having uniform body texture throughout to afford a proper wiping lip consistency extending outwardly a relatively short distance from the like body consistency but which has a different textured flat rubber surface on each side capable of being molded by a single operation. The flat surface adjoins the wiping lip either directly or through a slight shoulder and is composed of a multiplicity of contact points through which some of the arm-applied pressure is distributed when moving over an insufficiently wet surface. The total area of the contacting points, or the total friction produced thereby, is less than that of the wiping lip and is incapable in itself of holding the blade down independently of the lip. Consequently, the wiping edge continues to function more nearly at the normal contact angle.

A further object of the present invention is to provide a wiping blade as a molded unit with two differently textured wiping surfaces possessing different cling factors, namely, an outermost wiping lip, designed for riding freely over a fully wet glass, and an adjacent gliding face replete with infinitesimal projections as defined by intercommunicating passages opened to the atmosphere to thereby preclude a bonding adhesion to the surface. In effect, these passages form an aerated pad on each side of the blade body replete with minute projections that act to support the twisting blade body and reduce the adhesion to its desired minimum. This textured face or pad provides a composite gliding face sufficiently friction-free to effectively ride over the area traversed thereby. The principle of operation of this adhesion variation of the side face structure from that of the lip is based on the finding that less bonding and free-sliding result when the wiping edge margin above the cutting edge is replete with tiny passages or pores, which under tension will glide in facial contact with the glass and avoid a tight bonding with the glass. The tiny surface passages further serve to retain moisture by capillary attraction for lubricating the contacting points on a partially dry surface for easing the gliding movement and wiping action.

The invention also resides in a self-lubricating wiping face that not only limits the clinging tendency of the wiping face but also fixes it relative to the lip cling and at a point insufficient of itself to retain the blade in an abnormally rolled or twisted condition independently of the lip cling whereby it will not encourage a further roll-over of the blade body. In other words, the aerated pads serve to center the dominating cling wholly to the lip and against a progressive shift up along the side of the blade body. When encountering cling, through want of water lubrication, the lip rolls under and brings the differently textured side face down into contact with the glass. As this action takes place, the friction of the textured face of the lip on the drier surface will retain the wiping lip in a secondary or modified angular relation to the glass, with its wiping edge trailing. The friction on the partially wet or dry glass is prevented from rising to the friction status formerly imposed in early used wiper blades having uniform surface texture. This action is the result of having the two completely different surface textures in a single molded element, one surface having a calendered lip or shallow smooth face to singly contact the glass for normal wiping and the other face designed to act jointly with the lip on a partially dry area to hold the lip operative and to ease its sliding contact with the glass at an altered lip angle. Both lip surfaces, being substantially of uniform or equal resiliency, remain in contact with the partially wet glass under a friction differential. Thus, it is possible to provide a wiper blade having greatly reduced motor torque to insure a continuous performance of the blade under glass-drying conditions without stalling the motor, and at the same time to avoid the deposit of blade rubber on the glass resulting from excessive lip-cling.

The foregoing and other objects will manifest themselves as this description progresses, reference being made to the accompanying drawing, wherein FIG. 1 is a side elevation of the improved wiping blade operatively applied to the windshield surface;

FIG. 2 is a fragmentary perspective view of the improved rubber blade;

FIG. 3 is an enlarged fragmentary view of the wiping lip and the adjoining surface textured side face;

FIG. 4 is a fragmentary view under even greater magnification;

FIG. 5 is a schematic view showing the blade in its operating position on a wet surface;

FIG. 6 is a like view showing the blade on a partially wet surface under cling or surface tension; and FIG. 7 is a fragmentary schematic enlargement of the wiping lip portion of the blade in its normal and clinging positions.

Referring more particularly to the drawing, the numeral 1 designates a section of a curved windshield of the present day panoramic type, 2 an oscillatory wiper shaft, 3 its wiper carrying arm, and 4 the tension spring of the arm operative to apply the wiping pressure on the wiper 5. The wiper embodies a squeegee or blade 6 supported by a surface conforming backing strip 7 to which the arm pressure is distributed through a superstructure 8, which latter is more fully described in copending application Serial No. 485,267, now Patent No. 2,871,498.

The blade 6 comprises a rubber body 9 with a wiping lip 10 on one longitudinal margin and an anchoring bead 11 hinged to the opposite longitudinal margin by a neck 12, the term rubber being comprehensive of like elastic substitutes. The body 9 also has side wiping faces 13 that are normally inoperative but which are adapted to be brought down into wiping contact with the windshield glass in response to a cling-induced tug upon the wiping lip 10.

According to the present invention, each side face is textured during the blade molding operation with myriad infinitesimal projections 14 that define intercommunicating capillary channels or passages 15 designed generally to break the adhesion of the side face to the glass surface. In preparing the mold cavity, the side walls thereof are mechanically treated, as by sand blasting, to roughen them above the wiping lip section of the mold. From this mechanically treated cavity, the rubber blades are molded to give them a smoothly finished wiping lip 10, having a calendered surface, and a slightly roughened face 13 on each side of the blade body above the lip. The surface finish of the lip is bright and reflective in appearance, in contrast to a soft velvety surface finish of the side faces 13 which, while being supported by and formed from the same body texture, are dull and less colorful than the lip area. The facial surface has in effect a mechanically textured surface which affords a labyrinthian facial characteristic capable of freely admitting air throughout the multitudinous pressure points and of holding lubricating moisture to ease its movement across a dry or partially dry surface.

In practice, the presence of the facial channels or passages has reduced the torque load by fifty percent. Where, by way of example, the torque load on a wiper arm from a smooth, calendered lip operating over a partially wet surface was twelve inch-pounds, in contrast with the aerated facial contact of the present disclosure the resulting torque load under like conditions and dimensions dropped to six inch-pounds. The surface tension is largely broken so that the adhesion is materially lessened and therefore the tendency to stall the motor is likewise reduced, making it possible to use a lighter windshield cleaner motor.

Preferably, the aerated face 13 is coextensive with the wiping lip and offset outwardly to provide a slight shoulder 16 of .003 of an inch to definitely delineate an aerated face on each side of the blade above the calendered lip, to separate the area of lesser cling from that of greater cling, as depicted in FIG. 7. The wiping lip is also reduced in height, approximating .015 of an inch, to proportion its maximum cling to a degree that will protect the wiping mechanism from an excessive load above that determined by the pad as the blade begins its forward roll in response to an abnormal tug on its lip. The roughened face 13 breaks up the solid contact area when the suction increasingly manifests itself at the start of the forward roll-over of the blade during the process of cling regeneration as the load and friction develop. The solid contact area is replaced by a multitude of point contacts interspersed among the air and capillary passages thereby to limit the added cling to a degree less than the lip cling, and since the aerated pad has a generally flat top the lip will not be levered off the glass surfaces by a creeping or progressive dominating force as in the former blades. The aerated side faces 13 always act jointly with a clinging wiping lip by being rolled into contact with the windshield surface in response to a cling-energized pull initiated by the wiping lip. This transfers the arm pressure to the facial pads and by reason of the tiny aerated moisture retention passages any possible heavier adhesion of the lip pad on the glass will be precluded. The lip will maintain its trailing, wiping contact under its limited cling and as soon as this is broken the wiper will continue its stroke since the partial roll over onto the pad will encounter only a non-arresting cling.

The foregoing description has been given in detail but without thought of limitation since the air and capillary passages may be formed otherwise, and the teachings of the present invention may be incorporated in other physical embodiments, without departing from the spirit of the invention and the scope of the appended claims.

What is claimed is:

1. A windshield wiper comprising a rubber blade of uniform body texture throughout having a wiping lip with smooth sides possessed of a definite cling factor and an adjacent body part with flat side faces interrupted throughout with myriad minute capillary surface passages defining a myriad of irregularly spaced contact points to reduce the cling factor in the side faces below that in the lip, each side face being offset by an overhanging shoulder along its line of juncture with the respective smooth side of the lip to support the adjacent portion of the lip spaced from an associated glass surface while maintaining prevailing adhesion of the free edge of the lip to a partially wet surface.

2. A windshield wiper comprising a rubber blade with a wiping lip with smooth sides and a normally inactive pad on each side face of the blade body, each pad having a flat face with its surface restrictedly broken to provide myriad contact points limiting its suction hold to the surface of a windshield glass, said contact points being spaced to define myriad minute surface passages, said pads being offset by longitudinally extending overhanging the smooth sides of the lip.

3. A windshield wiper comprising an integral rubbery blade body of uniform texture throughout having a wiping lip with a cling factor for wiping a fully wet surface, and side wiping faces flanking the lip and converging toward the wiping lip, the latter being possessed of a definite cling factor, each side wiping face being offset outwardly from the plane of the side of the lip to form an overhanging shoulder and normally inoperative and roughed to restrict its adhesion to a degree less than that of the lip to provide the blade body with two wiping areas possessing different cling factors, the wiping lip having the greater cling factor for maintaining a lip wiping contact with the surface being wiped and operable to cling to a partially wet surface to induce a forward roll of the blade body for bringing the adjoining side wiping face with its lesser cling factor down into wiping contact jointly with the lip while maintaining the lip contact on such partially wet surface, the lesser cling factor being incapable of holding the side wiping face in its operative position independently of the lip cling.

References Cited in the file of this patent

UNITED STATES PATENTS

| | | |
|---|---|---|
| 1,944,051 | Zaiger | Jan. 16, 1934 |
| 1,978,633 | Horton | Oct. 30, 1934 |
| 2,140,453 | Horton | Dec. 13, 1938 |
| 2,751,619 | Chambers | Jan. 26, 1956 |
| 2,733,469 | Oishei | Feb. 7, 1956 |
| 2,952,865 | Rohr et al. | Sept. 20, 1960 |